Sept. 28, 1965  H. R. DINGES  3,208,413
PRECISION SEED PLANTER FEEDER
Filed April 6, 1964  2 Sheets-Sheet 1

INVENTOR.
HAROLD R. DINGES.
BY
Willard S. Grund
ATTORNEY.

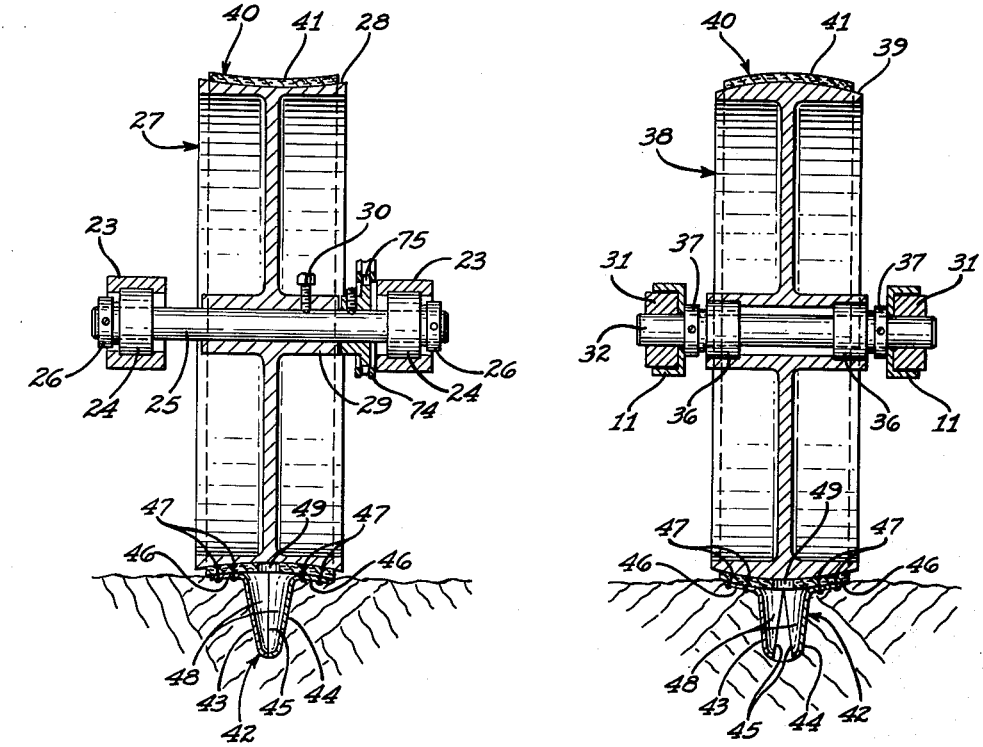
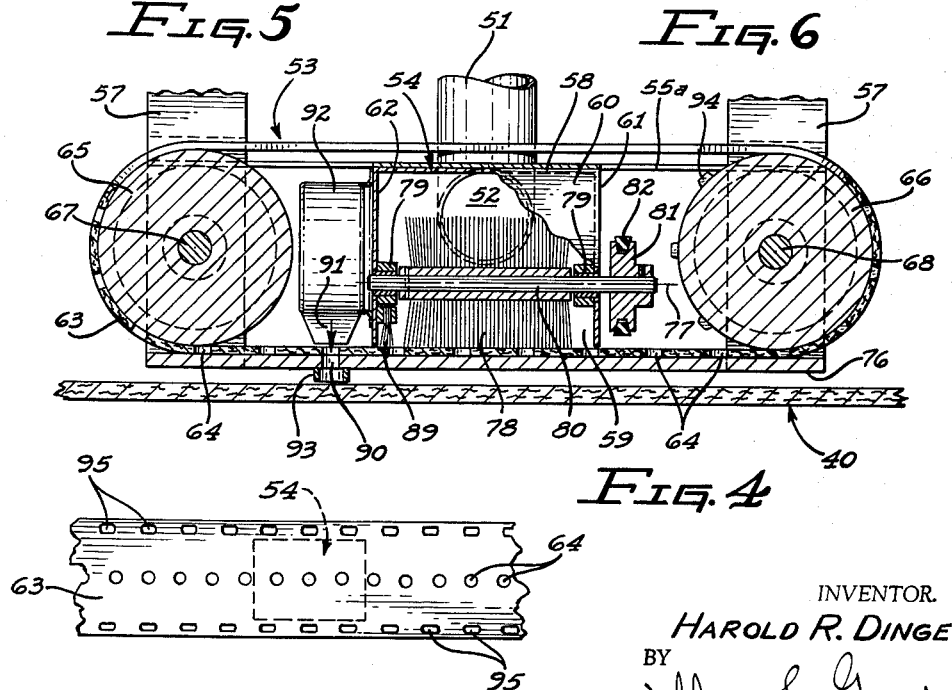

United States Patent Office 3,208,413
Patented Sept. 28, 1965

3,208,413
PRECISION SEED PLANTER FEEDER
Harold R. Dinges, Kansas City, Mo., assignor to Precision Agricultural Machinery Company, Phoenix, Ariz., a corporation of Arizona
Filed Apr. 6, 1964, Ser. No. 357,393
2 Claims. (Cl. 111—34)

This invention pertains to agricultural machinery and is particularly directed to a precision seed planter.

One of the objects of this invention is to provide a precision seed planter with a highly efficient seed feeder of simple construction and operation and high reliability.

One of the objects of this invention is to provide a precision seed planter having a seed feeder for accurately and rapidly planting seeds at longitudinally accurately spaced intervals along a plant row of a field.

Another object of this invention is to provide a precision seed planter with a seed feeder capable of injecting at high speed a seed below the ground level at precisely spaced intervals along the field plant row.

It is a further object to provide a precision planter with a high efficient seed feeder that is particularly well adapted to plant seed in the soil of the plant row at accurately spaced intervals along the plant row.

Still another object of this invention is to provide a precision planter with a seed feeder capable of planting seed in a plant row in such manner that the planted materials in the ground are in exact spaced intervals along the plant row.

It is also an object to accomplish the above recited objectives with a precision seed planter having a unique seed feeder operable over the crop row in a continuous automatic manner.

A further object is to provide a seed feeder for rapidly and accurately feeding seed in exact amounts without cracking, grinding up or otherwise damaging the seed finally discharged for planting in the ground.

It is a further object to accomplish the above recited objectives with a specially constructed seed feeding unit devoid of reciprocating parts and operable over the crop row in a continuous rapid automatic manner.

Another object is to provide the aforementioned seed feeding unit operating in conjunction with an endless belt having a series of longitudinally split perforating and planting fingers projecting from the periphery thereof wherein the belt is carried on a pair of pulleys, one having a convex periphery and the other a concave periphery such that the operation of the belt over the pulleys effects the lateral opening and closing of said split fingers while the unique feeding unit presents seed, fertilizer and mulch through the belt and planting fingers.

Another object of this invention is to provide a seed feeding mechanism for a precision planter adapted to make individual selection of unencapsulated seeds in distributing the seeds to be planted.

Further features and advantages of this invention will appear from a detailed description of the drawings in which:

FIG. 4 is an enlarged sectional view on the line 4—4 of FIG. 3;

FIG. 5 is an enlarged fragmentary sectional view on the line 5—5 of FIG. 2;

FIG. 6 is an enlarged sectional view on the line 6—6 of FIG. 2;

FIG. 7 is an enlarged sectional view on the line 7—7 of FIG. 2.

Figure 1:
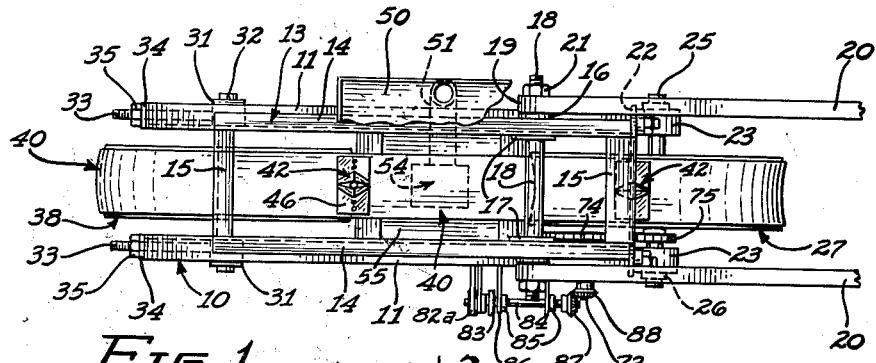
FIG. 1 is a top plan view of a precision seed feeding and planting apparatus incorporating the features of this invention.

As an example of one embodiment of this invention there is shown a precision seed planter comprising a frame 10 consisting of a pair of side rail channel members 11 which are fixed on the lower ends of the upright brackets 12 which are rigidly fixed to the upper support frame 13 comprising the side members 14 and end members 15. The tubular support member 16 fixed to the side members 14 by suitable plates 17 is pivotally mounted on the rockshaft 18 carried in the outer ends 19 of the usual lifting and positioning levers 20 of a tractor, not shown. Suitable nuts 21 threaded on the ends of the rockshaft 18 demountably secure the described frame structure on the tractor arms 20.

Figure 2:
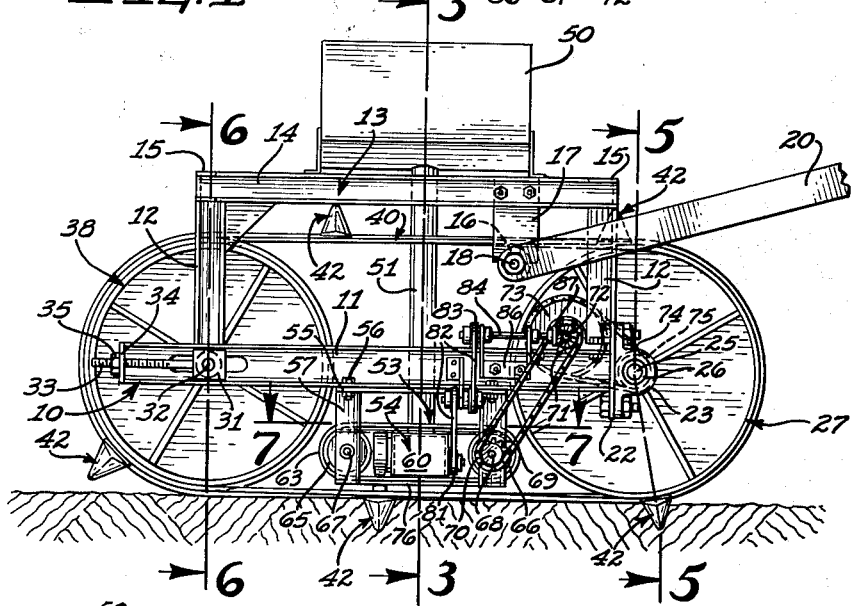
FIG. 2 is a right hand side elevation of the apparatus shown in FIG. 1.

On the front ends of the side rails 11, FIGS. 1 and 2, are fixed flanges 22 to which are secured the pillow blocks 23 containing anti-friction bearings 24 which support the concave pulley shaft 25, FIG. 5, held against axial movement in the bearings 24 by suitable lock collars 26 on the ends of the shaft 25. A concave pulley 27 having the concave peripheral surface 28 has the integral hub 29 which is securely locked to the shaft 25 by a suitable set screw 30.

On the rearward portions of the side rails 11, FIGS. 1 and 2, are longitudinally slidably mounted the adjusting blocks 31 in which is fixed the convex pulley shaft 32. Suitable adjusting screws 33 are fixed to and extend rearwardly from the adjusting blocks 31 and pass through abutment plates 34 fixed to rear ends of the side rails 11. Appropriate jamb nuts 35 threaded on the adjusting screws 33 abut against the plates 34 to pull the convex pulley shaft 32 rearwardly of the side rails 11 to desired positions. Anti-friction bearings 36 are held against axial movement on the shaft 32 by suitable lock collars 37, FIG. 6, and rotatably support the convex pulley 38 having the convex peripheral surface 39. A flat belt 40 operates over the concave surface 28 and the convex surface 39 of the pulleys 27 and 38 and by appropriately adjusting the nuts 35 proper tension is maintained in the belt 40.

Projecting outwardly from the outer peripheral surface 41 of the belt 40 are the split planter fingers 42 each of which comprises a pair of laterally disposed segments 43 and 44, FIG. 6, having a parting line 45 lying in a longitudinally disposed plane parallel to the direction of belt travel. Each segment 43 and 44 has a mounting flange 46 extending laterally away from the parting line 45 outwardly from the root of the planter finger segment which is securely riveted at 47 or otherwise secured to the outer peripheral surface 41 of the belt 40. Each of the segments 43 and 44 are hollowed out at 48 so as to form a seed compartment which communicates with an opening or seed passageway 49 formed in the belt 40.

Figure 3:
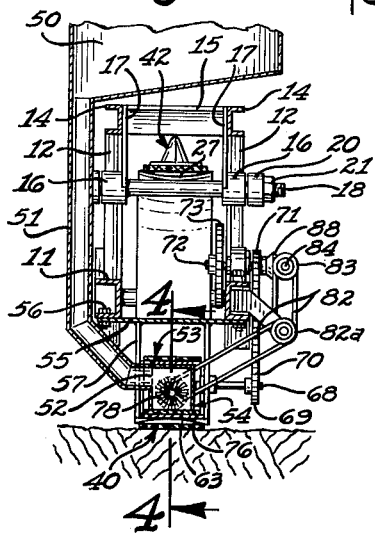
FIG. 3 is a fragmentary sectional view on the line 3—3 of FIG. 2.

A seed hopper 50, FIG. 2, carried on the seed supply pipe 51 appropriately fixed to the frame 10 is connected at its lower end with the inlet passageway 52 of the precision seed feeding unit 53 comprising the main seed box 54 which is fixed by a suitable plate 55a to the upright supports 57 which are fixed to plate 55, which is held by bolts 56, FIG. 3, to the side rails 11.

The seed box 54 comprises a top 58, sides 59 and 60 and the front end 61 and rear end 62 integrally connected together. A feed belt 63 extends under the open bottom of the seed box 54 and has a series of longitudinally spaced seed holes 64 extending through the belt and having a diameter to slightly exceed the maximum size of the sorted, untreated seed that is to be fed by the feeding apparatus. The belt 63 is of endless type and operates over a pair of spaced pulleys 65 and 66 suitably supported and journaled on shafts 67 and 68 on the frame 10.

The pulley 66 has a sprocket 69 fixed thereto over which operates the drive chain 70 in turn operating over a sprocket 71 fixed to the intermediate shaft 72 suitably supported and journaled on the frame 10. A sprocket wheel 73 is fixed to the intermediate shaft 72 over which operates the drive chain 74 in turn operating over the sprocket 75 fixed to the concave pulley shaft 25 of the precision planter mechanism described so that the seed feeding belt 63 will be driven by the movement of the planter along the plant row, the belt 63 serving as a continuously longitudinally moving bottom of the seed box 54 and is held with close tolerances to the bottom edges of the sides and ends of the seed box 54 by a plate guide 76 fixed on the frame 10 upon which the seed feeding belt 63 is slidingly supported. Preferably, one of the pulleys 65 or 66 may be arranged under tension by suitable adjustable spring loading, not shown, to keep the seed feeding belt 63 taut so that it will not allow seeds to escape along the sides of the seed box 54.

Rotating on an axis 77 that is parallel to the direction of movement of the seed feeding belt 63 is the feeding brush 78 journaled against axial movement on a shaft 80 mounted on suitable bearings 79 carried in the ends 61 and 62 of the seed box 54. The shaft 80 extends out through the end 61 and has fixed thereon a pulley 81 over which operates the belts 82 in turn operating over idler pulleys 82a and the large pulley 83 fixed to the drive shaft 84 suitably journaled in a bearing 85 carried in a bracket 86 fixed to the frame 10. On the opposite end of the shaft 84 from the large pulley 83 is fixed the bevel gear 87 which is driven by a bevel gear 88 fixed on the intermediate shaft 72. By this arrangement the feeding brush is driven by the forward motion of the planter with the bristles brushing lightly across the top surface over the holes 64 in a transverse direction of the seed feeding belt 63 as the belt feeds longitudinally under the brush across the open bottom of the seed box 54. Just before the seed feeding belt 63 emerges from under the seed box 54 a fixed transverse brush 89 brushes off any seeds that might be lying on top of the belt 63.

In operation: The seed box 54 is filled with seed from the supply hopper 50 so that as the planter is pulled along a plant row, the rotating feed brush 78 will keep the seed in constant agitation. By constantly brushing seeds across the open holes 64 in the forwardly moving belt, the holes will eventually become filled. Once a hole 64 is filled the size of the holes will be such that another seed cannot crowd itself in, and the brush 78 will not brush hard enough to remove the seed from the hole once it has become lodged therein. The seed will be carried through the bottom end wall 62 of the seed box 54 to the outside, where it will encounter a discharge opening or seed ejector hole 90 in the guide plate 76. A constant, gentle flow of air 91 blowing downwardly from an air nozzle 92, supplied from a conventional source of air pressure, not shown, against the top of the belt will force the seed through the hole 90 in the plate 76 into a retention chamber 93 immediately above the planting fingers of the planter belt 40 for discharge of the seed into the seed passageway 49 and hollowed out segments 48 of the planting fingers 42.

In certain instances it may be desirable to provide positive driving lugs 94 on the pulley 66 to maintain a non-slip positive synchronization of the seed feeding belt and the planter belt 40 as the planter moves along the plant row. In this arrangement, FIG. 7, the belt 63 of the feeder is made wider than the box and will have large perforations 95 along its outer edges which mesh with the lugs 94 on the driving pulley 66.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appended claims are intended to be included herein. Having thus fully set forth and described this invention what is claimed and desired to be obtained by United States Letters patent is:

1. A precision seed planter comprising in combination:
   (a) a frame,
   (b) a concave pulley journaled on the front end of said frame,
   (c) a convex pulley journaled on the rear end of said frame,
   (d) a flat planter belt operating over the concave and convex peripheries of said pulleys,
   (e) a series of longitudinally spaced planter fingers mounted on the outer peripheral surface of said planter belt, each finger comprising,
   (f) a pair of laterally positioned segments having,
   (g) a parting line lying in a longitudinally disposed plane parallel to the direction of planter belt travel and,
   (h) mounting flanges extending laterally away from said parting line plane outwardly away from the root of said planter finger segments,
   (i) means for securing said flanges to said planter belt,
   (j) hollowed out portions formed in each of said segments adjacent said parting line,
   (k) a seed passageway formed through said planter belt in communication with said hollowed out portions of said seed finger segments,
   (l) an endless belt precision seed feeding unit on said frame adapted to present accurately metered quantities of seed to said seed passageways in said planter belt as said planter belt travels from said concave pulley to said convex pulley comprising,
   (m) seed box fixed on said frame,
   (n) an inlet passageway in the top of said seed box,
   (o) an open bottom in said seed box,
   (p) a seed chamber formed within said seed box communicating with said open bottom thereof,
   (q) a seed hopper on said frame communicating with said inlet passageway,
   (r) a pair of feeder pulleys journaled on said frame spaced longitudinally of and located above the lower ground engaging run of said planter belt adapted to operatively support said endless belt of said feeding unit,
   (s) a guide plate fixed on said frame below the open bottom of said seed box and above said lower ground contacting run of said planter belt adapted to engage the undersurface of the lower run of said feeder belt to maintain the bottom of said seed box closed as said feeder belt moves over said open seed box bottom,
   (t) a discharge opening in said guide plate laterally aligned with said seed passageways in said planter belt and located beyond the rear end of said seed box,
   (u) means for ejecting seed from said seed discharge opening in said guide plate into said seed passageways in said planter belt,
   (v) a series of longitudinally spaced seed holes formed through said feeder belt adapted to move over said discharge opening in said guide plate,
   (w) means for driving said feeder belt from the forward travel motion of said planter along a plant row,
   (x) and means in said seed box for agitating the seeds therein to cause them to enter said seed holes in said feeder belt.

2. A precision seed planter comprising in combination:
   (a) a frame,
   (b) a concave pulley journaled on the front end of said frame, (c) a convex pulley journaled on the rear end of said frame,
(d) a flat planter belt operating over the concave and convex peripheries of said pulleys,
(e) a series of longitudinally spaced planter fingers mounted on the outer peripheral surface of said planter belt, each finger comprising,
(f) a pair of laterally positioned segments having,
(g) a parting line lying in a longitudinally disposed plane parallel to the direction of planter belt travel and
(h) mounting flanges extending laterally away from said parting line plane outwardly away from the root of said planter finger segments,
(i) means for securing said flanges to said planter belt,
(j) and hollowed out portions formed in each of said segments adjacent said parting line,
(k) a seed passageway formed through said planter belt in communication with said hollowed out portions of each of said seed finger segments,
(l) an endless belt precision seed feeding unit on said frame adapted to present accurately metered quantities of seed to said seed passageways in said planter belt as said planter belt travels from said concave pulley to said convex pulley comprising,
(m) seed box fixed on said frame,
(n) an inlet passageway in the top of said seed box,
(o) an open bottom in said seed box,
(p) a seed chamber formed within said seed box communicating with said open bottom thereof,
(q) a seed hopper on said frame communicating with said inlet passageway,
(r) a pair of feeder pulleys journaled on said frame spaced longitudinally of and located above the lower ground engaging run of said planter belt adapted to operatively support said endless belt of said feeding units,
(s) a guide plate fixed on said frame below the open bottom of said seed box and above said lower ground contacting run of said planter belt adapted to engage the undersurface of the lower run of said feeder belt to maintain the bottom of said seed box closed as said feeder belt moves over said open seed box bottom,
(t) a discharge opening in said guide plate laterally aligned with said seed passageways in said planter belt and located beyond the rear end of said seed box,
(u) means for ejecting seed from said seed discharge opening in said guide plate into said seed passageways in said planter belt,
(v) a series of longitudinally spaced seed holes formed through said feeder belt adapted to move over said discharge opening in said guide plate,
(w) means for driving said feeder belt from the forward travel motion of said planter along a plant row,
(x) said seed box agitating means comprising a cylindrical brush rotating on a horizontal axis extending in the direction of feeder belt travel having radially extending bristles adapted to brush measured amounts of seed into said feed belt seed holes,
(y) and means for driving said brush in rotation from the forward movement of said planter along the plant row.

References Cited by the Examiner

UNITED STATES PATENTS

| | | | |
|---|---|---|---|
| 1,099,774 | 6/14 | Smith | 111—34 |
| 2,462,276 | 2/49 | Mueller | 198—30 |
| 2,770,400 | 11/56 | Mattson | 222—222 |
| 3,154,032 | 10/64 | Kappelmann | 111—77 |

ABRAHAM G. STONE, *Primary Examiner.*

WILLIAM A. SMITH III, *Examiner.*